United States Patent
Yamada et al.

(10) Patent No.: US 9,348,594 B2
(45) Date of Patent: May 24, 2016

(54) CORE SWITCHING ACCELERATION IN ASYMMETRIC MULTIPROCESSOR SYSTEM

(75) Inventors: Koichi Yamada, Santa Clara, CA (US); Boris Ginzburg, Haifa (IL); Wei Li, Palo Alto, CA (US); Ronny Ronen, Haifa (IL); Esfir Natanzon, Haifa (IL); Konstantin Levit-Gurevich, Kiryat-Bialik (IL); Gadi Haber, Nesher (IL); Alon Naveh, Ramat Hasharon (IL); Eliezer Weissmann, Haifa (IL); Michael Mishaeli, Zikhron Yaakov (IL)

(73) Assignee: Intel Corporation, Santa Clara, CA (US)

( * ) Notice: Subject to any disclaimer, the term of this patent is extended or adjusted under 35 U.S.C. 154(b) by 366 days.

(21) Appl. No.: 13/992,710

(22) PCT Filed: Dec. 29, 2011

(86) PCT No.: PCT/US2011/067851
§ 371 (c)(1),
(2), (4) Date: Jun. 7, 2013

(87) PCT Pub. No.: WO2013/101069
PCT Pub. Date: Jul. 4, 2013

(65) Prior Publication Data
US 2013/0268742 A1    Oct. 10, 2013

(51) Int. Cl.
*G06F 9/40* (2006.01)
*G06F 9/30* (2006.01)
*G06F 9/50* (2006.01)

(52) U.S. Cl.
CPC .......... *G06F 9/30181* (2013.01); *G06F 9/5044* (2013.01); *G06F 9/5094* (2013.01); *Y02B 60/142* (2013.01)

(58) Field of Classification Search
CPC .................................................. G06F 12/0862
See application file for complete search history.

(56) References Cited

U.S. PATENT DOCUMENTS

| 7,730,470 | B2 | 6/2010 | Sharapov et al. |
| 7,734,895 | B1 | 6/2010 | Agarwal et al. |
| 8,181,054 | B2 | 5/2012 | Terechko et al. |
| 8,549,200 | B2 | 10/2013 | Nakahashi et al. |
| 8,745,621 | B2 * | 6/2014 | Yang .................... G06F 9/45558 718/1 |
| 9,158,355 | B2 * | 10/2015 | Sutardja ................ G06F 1/3203 |
| 2007/0050555 | A1 | 3/2007 | Ferren et al. |

(Continued)

OTHER PUBLICATIONS

PCT International Search Report for PCT Counterpart Application No. PCT/US2011/067851, 3 pgs., (Sep. 25, 2012).

(Continued)

*Primary Examiner* — Cheng-Yuan Tseng
(74) *Attorney, Agent, or Firm* — Nicholson De Vos Webster & Elliot, LLP

(57) ABSTRACT

An asymmetric multiprocessor system (ASMP) may comprise computational cores implementing different instruction set architectures and having different power requirements. Program code executing on the ASMP is analyzed by a binary analysis unit to determine what functions are called by the program code and select which of the cores are to execute the program code, or a code segment thereof. Selection may be made to provide for native execution of the program code, to minimize power consumption, and so forth. Control operations based on this selection may then be inserted into the program code, forming instrumented program code. The instrumented program code is then executed by the ASMP.

19 Claims, 10 Drawing Sheets

(56) References Cited

U.S. PATENT DOCUMENTS

| | | |
|---|---|---|
| 2008/0244538 A1 | 10/2008 | Nair et al. |
| 2009/0222654 A1* | 9/2009 | Hum .................... G06F 13/24 713/100 |
| 2010/0274551 A1 | 10/2010 | Das et al. |
| 2011/0022817 A1 | 1/2011 | Gaster et al. |

OTHER PUBLICATIONS

PCT Written Opinion of the International Searching Authority for PCT Counterpart Application No. PCT/US2011/067851, 5 pgs., (Sep. 25, 2012).

PCT Notification concerning Transmittal of International Preliminary Report on Patentability (Chapter I of the Patent Cooperation Treaty) for PCT Counterpart Application No. PCT/US2011/067851, 7 pgs., (Jul. 10, 2014).

PCT International Search Report for PCT Application No. PCT/US2011/067654, 4 pgs., (Sep. 5, 2012).

PCT Written Opinion of the International Searching Authority for PCT Application No. PCT/US2011/067654, 4 pgs., (Sep. 5, 2012).

PCT Notification concerning Transmittal of International Preliminary Report on Patentability (Chapter I of the Patent Cooperation Treaty) for PCT Application No. PCT/US2011/067654, 6 pgs., (Jul. 10, 2014).

\* cited by examiner

CORE SWITCHING ACCELERATION IN ASYMMETRIC MULTIPROCESSOR SYSTEM

CROSS-REFERENCE TO RELATED APPLICATIONS

This patent application is a U.S. National Phase Application under 35 U.S.C. §371 of International Application No. PCT/US2011/067851, filed Dec. 29, 2011, entitled CORE SWITCHING ACCELERATION IN ASYMMETRIC MULTIPROCESSOR SYSTEM.

TECHNICAL FIELD

The invention described herein relates to the field of microprocessor architecture. More particularly, the invention relates to core switching in asymmetric multiprocessor systems.

BACKGROUND

An asymmetric multiprocessor system (ASMP) combines computational cores of different capabilities or specifications. For example, a first "big" core may contain a different arrangement of logic elements than a second "small" core. Threads executing program code on the ASMP would benefit from operating-system transparent core migration of program code between the different cores.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

DETAILED DESCRIPTION

Architecture

Figure 1:
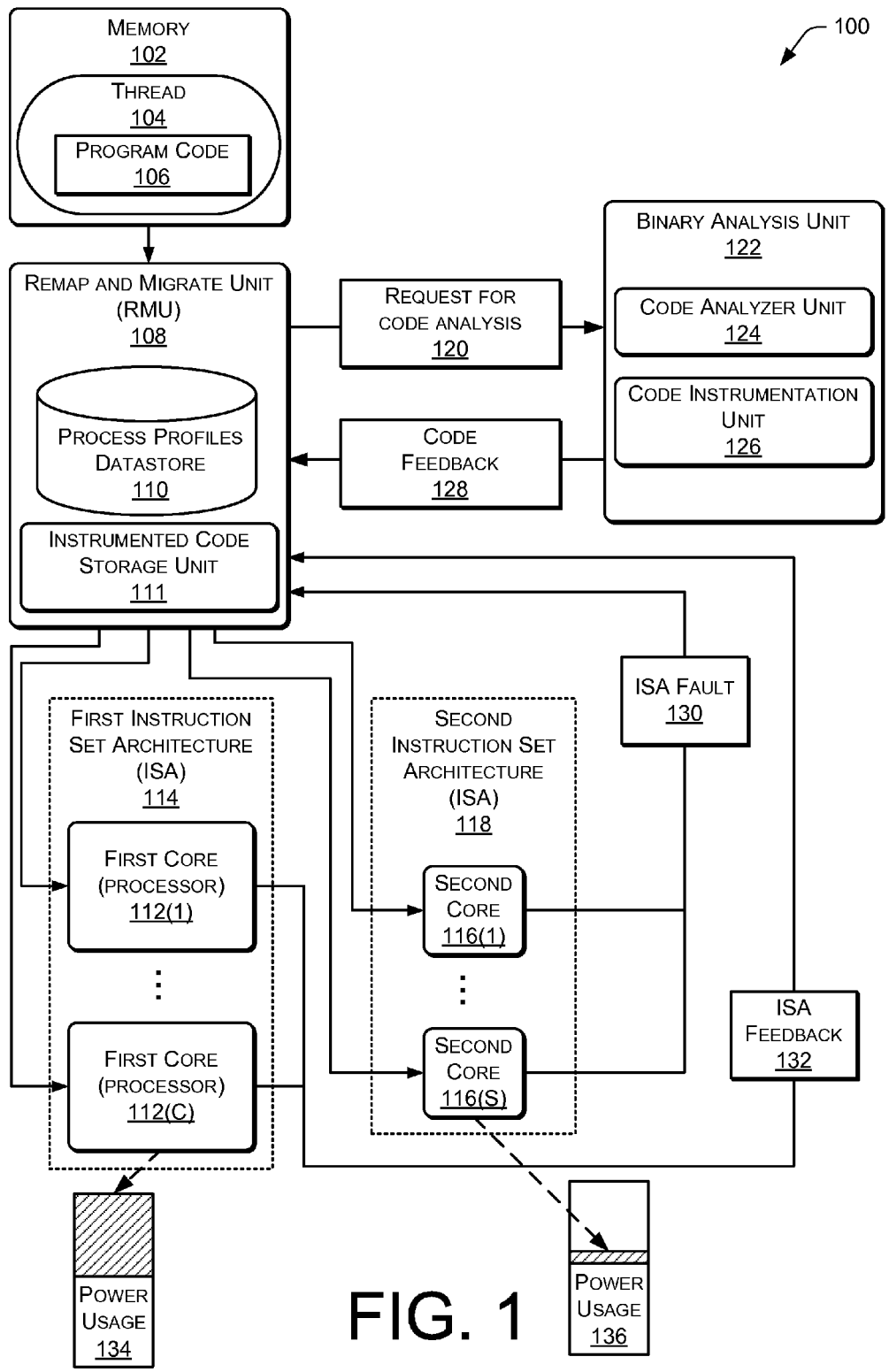
FIG. 1 illustrates a portion of an architecture of an asymmetric multiprocessor system (ASMP) providing for migration of program code between cores using a binary analysis unit comprising a code analyzer unit and a code instrumentation unit.

FIG. 1 illustrates a portion of an architecture 100 of an asymmetric multiprocessor system (ASMP). As described herein, this architecture provides for migration of program code between cores using a binary analysis unit comprising a code analyzer unit and a code instrumentation unit.

A memory 102 comprises computer-readable storage media ("CRSM") and may be any available physical media accessible by a processing core or other device to implement the instructions stored thereon or store data within. The memory 102 may comprise a plurality of logic elements having electrical components including transistors, capacitors, resistors, inductors, memristors, and so forth. The memory 102 may include, but is not limited to, random access memory ("RAM"), read-only memory ("ROM"), electrically erasable programmable read-only memory ("EEPROM"), flash memory, magnetic storage devices, and so forth.

Within the memory 102 may be stored an operating system (not shown). The operating system is configured to manage hardware and services within the architecture 100 for the benefit of the operating system ("OS") and one or more applications. During execution of the OS and/or one or more applications, one or more threads 104 are generated for execution by a core or other processor. Each thread 104 comprises program code 106.

A remap and migrate unit 108 comprises logic or circuitry which receives the program code 106 and migrates it across an asymmetric plurality of cores for execution. The asymmetry of the architecture results from two or more cores having different instruction set architectures, different logical elements, different physical construction, and so forth. As shown here, the remap and migrate unit 108 may comprise memory to store process profiles, forming a process profiles datastore 110. The process profiles datastore 110 contains data about the threads 104 and their execution. The RMU 108 may also comprise an instrumented code storage unit to store instrumented program code for execution. The instrumented program code and generation thereof is discussed below.

Coupled to the remap and migrate unit 108 are one or more first cores (or processors) 112(1), 112(2), . . . , 112(C). These first cores 112 implement a first instruction set architecture (ISA) 114. Also coupled to the remap and migrate unit 108 are one or more second cores 116(1), 116(2), . . . , 116(S). As used herein, letters in parenthesis such as (C) and (S) are positive integers greater than or equal to one. These second cores 116 implement a second ISA 118. In some implementations the quantity of the first cores 112 and the second cores 118 may be asymmetrical. For example, there may be a single first core 112(1) and three second cores 116(1), 116(2), and 116(3). While two instruction set architectures are depicted, it is understood that more ISAs may be present in the architecture 100. The ISAs in the ASMP architecture 100 may differ from one another, but one ISA may be a subset of another. For example, the second ISA 118 may be a subset of the first ISA 116.

In some implementations the first cores 112 and the second cores 116 may be coupled to one another using a bus or interconnect. The interconnect may be arranged as a mesh interconnect, a shared interconnect, a peer-to-peer (P2P) interconnect, a ring interconnect, and so forth. The first cores 112 and the second cores 116 may be configured to share cache memory or other logic. As used herein, cores include, but are not limited to, central processing units (CPUs), graphics processing units (GPUs), floating point units (FPUs) and so forth.

The remap and migrate unit 108 may receive the program code 106 and issue a request for code analysis 120 to a binary analysis unit 122. The binary analysis unit 122 is configured to provide a binary analysis of the program code 106. This binary analysis determines functions of the program code 106. This determination may be used to select which of the cores to execute the program code or portions thereof upon 106. The binary analysis unit 122 may comprise a code analyzer unit 124 which comprises logic to assess what instruction set architecture the program code 106 or a portion thereof natively uses. The code analyzer unit 122 and code analysis is discussed below in more detail with regards to FIG. 2.

A code instrumentation unit 126 comprises logic to add control micro-operations into the program code 106, forming instrumented program code which may be stored in the instrumented code storage unit 111. These control micro-operations are added at least partly in response to output from the binary analysis unit 122. Once stored, the instrumented code may be executed on the first core 112 or the second core 116. Instrumentation may be processed by the RMU 108 to determine which core to migrate the code to. The code instrumentation unit 126 and the insertion of micro-operations is discussed in more detail below with regards to FIG. 3.

The binary analysis unit 122 provides code feedback 128 to the remap and migrate unit 108. This code feedback 128 may comprise instrumented program code generated by the code instrumentation unit 126. The remap and migrate unit 108 may then use the control micro-operations in the instrumented program code to control core switching and operations related thereto during execution of the thread.

The remap and migrate unit 108 may receive ISA faults 130 from the second cores 116. For example, when the program code 106 contains an instruction which is non-native to the second ISA 118 as implemented by the second core 116, the ISA fault 130 provides notice to the remap and migrate unit 108 of this failure. The remap and migrate unit 108 may also receive ISA feedback 132 from the cores, such as the first cores 112. The ISA feedback 132 may comprise data about instructions used during execution, processor status, and so forth. The remap and migrate unit 108 may use the ISA fault 130 and the ISA feedback 132 to modify migration of the program code 106 across the cores.

The first cores 112 and the second cores 114 may use differing amounts of power during execution of the program code 106. For example, the first cores 112 may individually consume a first maximum power during normal operation at a maximum frequency and voltage within design specifications for these cores. The first cores 112 may be configured to enter various lower power states including low power or standby states during which the first cores 112 consume a first minimum power, such as zero when off. In contrast, the second cores 112 may individually consume a second maximum power during normal operation at a maximum frequency and voltage within design specification for these cores. The second maximum power may be less than the first maximum power. This may occur for many reasons, including the second cores 116 having fewer logic elements than the first cores 112, different semiconductor construction, and so forth. As shown here, a graph depicts maximum power usage 134 of the first core 112 compared to maximum power usage 136 of the second core 116. The power usage 134 is greater than the power usage 136.

The remap and migration unit 108 may use the code feedback 128 to migrate program code 108 between the first cores 112 and the second cores 116 to reduce power consumption, increase overall utilization of compute resources, provide for native execution of instructions, and so forth. In one implementation to minimize power consumption, the program code 106 may be migrated to the second core 116 having lower power usage 136 for execution with only portions of the program code 106 calling for instructions native on the first ISA 114 being executed on the first core 112. As a result, most execution occurs on the first second core 116, which consumes less electrical power. By using the instrumented program code, the remap and migrate unit 108 may warmup, or restore to a specified operational state, the first core 112 such that core switching occurs seamlessly and without a significant impact on performance.

In some implementations, such as in systems-on-a-chip, several of the elements described in FIG. 1 may be disposed on a single die. For example, the first cores 112, the second cores 116, the memory 102, and so forth may be disposed on the same die.

Figure 2:
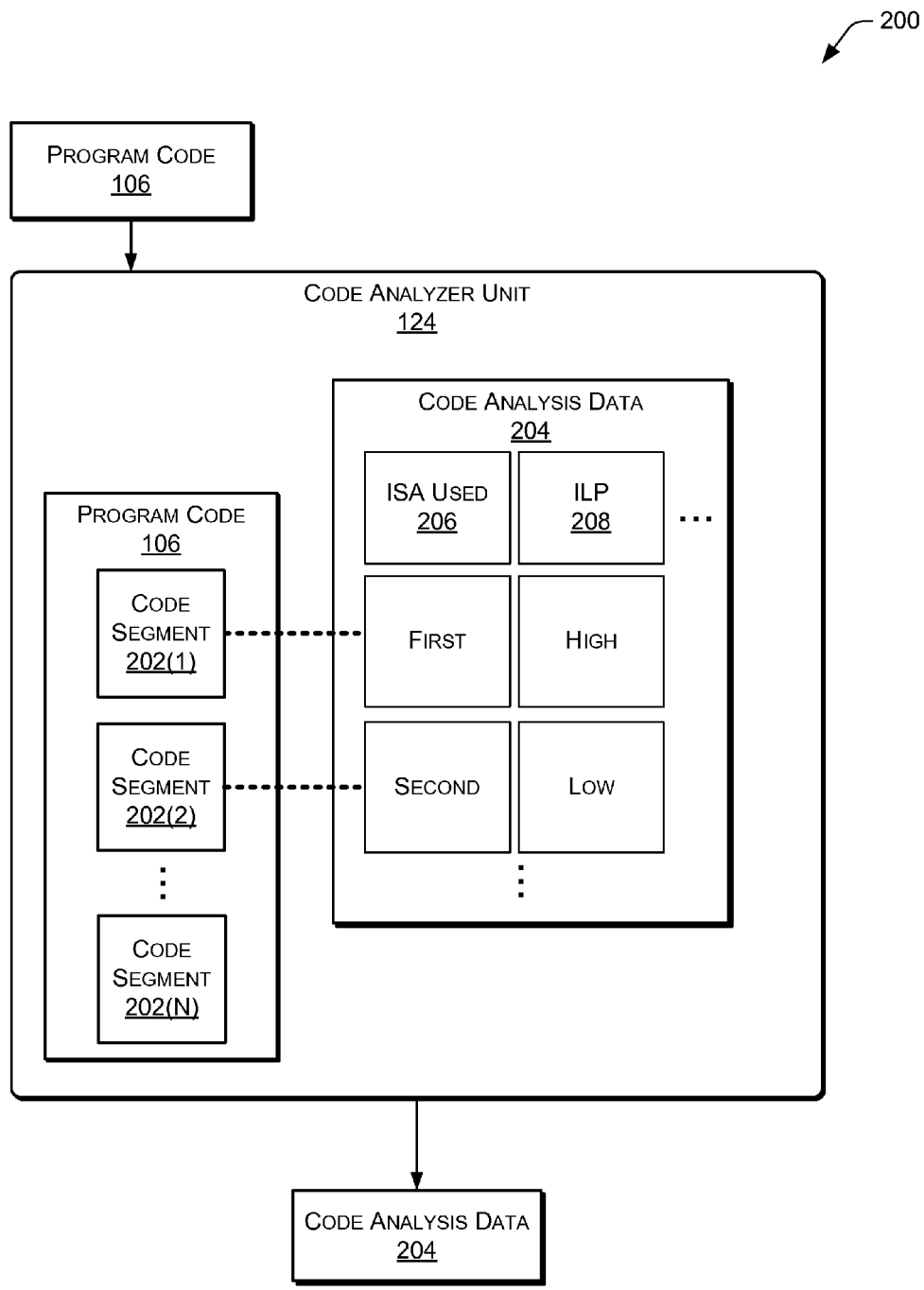
FIG. 2 illustrates analysis of the program code by the code analyzer unit to generate code analysis data.

FIG. 2 illustrates analysis 200 of the program code 106 by the code analyzer unit 124 in the binary analysis unit 122. As indicated here, the code analyzer unit 124 receives the program code 106, or a portion thereof, of the thread 104. The program code 106 comprises one or more code segments 202(1), 202(2), . . . , 202(N). The code segments 202 may be of varying length. The length may be determined by the code analyzer unit 124. The program code 106 may be distributed into the code segments based upon functions called, instruction set used, instruction complexity, and so forth.

The code analyzer unit 124 comprises logic elements to generate code analysis data 204 from the program code 106. This code analysis data 204 may comprise one or more characteristics about the program code 106 and the code segments 202 therein. The characteristics of the code analysis data 204 may comprise an ISA used 206, indication of instruction level parallelism (ILP) 208, and so forth. The ISA used 206 characteristic indicates a particular instruction set architecture within which the code segment 202 executes natively. For example, the code segment 202(1) may call for an instruction which is natively available on the first core 112 without binary translation but is available through emulation on the second core 116 with binary translation. Thus, in this case the code segment 202(1) may be executed on either processor, but may execute faster on the first core 112 where execution is native without binary translation.

In other implementations, other characteristics may be included in the code analysis data. For example, the number of cycles for a given core to execute a particular instruction may be determined or estimated.

The code analyzer unit 124 may then output the code analysis data 204. The code analysis data 204 may include the program code 106, as well as other data, such as the ISA used, ILP, estimated cycles for execution, and so forth. In addition, the data 204 may include information about the ISA faults 130, the ISA feedback 132, or both.

Figure 3:
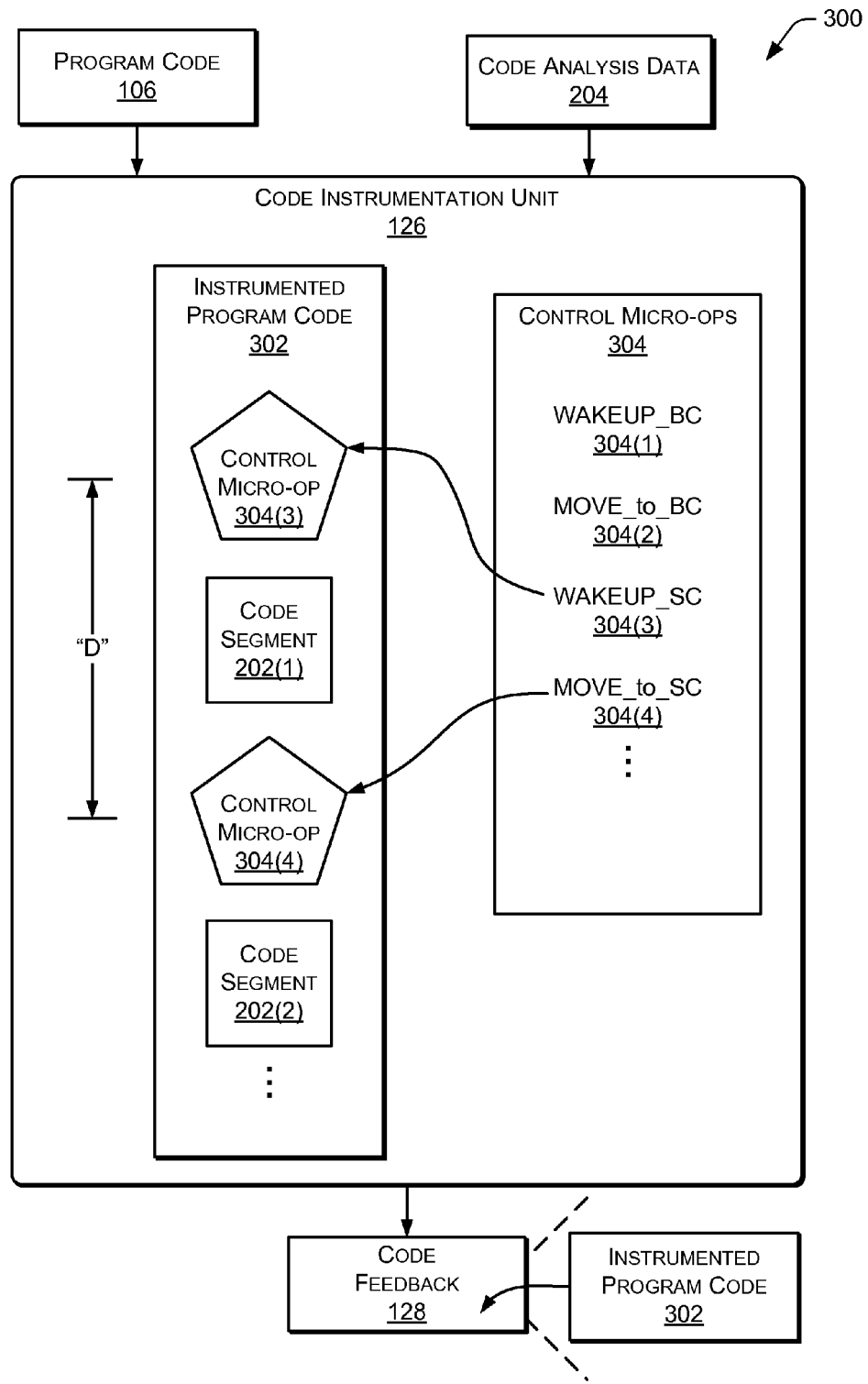
FIG. 3 illustrates the code instrumentation unit inserting control micro-operations into the program code to form instrumented program code at least partly in response to the code analysis data.

FIG. 3 illustrates the code instrumentation unit 126 inserting 300 instructions into the program code 106. These instructions may comprise macroinstructions, micro-operations, and so forth. While the following description uses the term micro-operations or micro-op, it is understood that in other architectures other instructions may be used.

The code instrumentation unit 126 receives the code analysis data 204 and the program code 106 and generates instrumented program code 302. The instrumented program code 302 comprises the program code 106 with control micro-operations (or micro-ops) 304 inserted therein. The control micro-ops 304 may include, but are not limited to, instructions for migrating threads between processors, changing operational states of a particular processor from one power state to another, and so forth. For example, as depicted here for sake of illustration and not by way of limitation, the control micro-ops 304 may comprise a WAKEUP_BC 304(1) micro-op, a MOVE_to_BC micro-op 304(2), a WAKEUP_SC micro-op 304(3), a MOVE_to_SC micro-op 304(4), and so forth. The WAKEUP_BC 304(1) when issued by the remap and migrate unit 108 brings the first core 112 from a lower power state to a higher power state. For example, the WAKEUP_BC 304(1) transitions the first core 112 from a low power standby state to full power operational state ready for execution of instructions.

The MOVE_to_BC micro-op 304(2) initiates a core migration of the thread 104 and the associated program code 106 or code segments thereof 202 from one core executing the instructions such as the second core 116 to the first core 112.

The WAKEUP_SC micro-op 304(3) when issued by the remap and migrate unit 108 brings the second core 116 from a lower power state to a higher power state. For example, the WAKEUP_SC 304(3) transitions the second core 116 from a low power standby state to full power operational state ready for execution of instructions. The MOVE_to_SC micro-op 304(4) initiates a core migration of the thread 104 and the associated program code 106 or code segments thereof 202 from the core executing the instrumented code, such as the first core 112, to the second core 116. To enable a correct returning point back to the first core 112, the code instrumentation unit 126 may insert the WAKEUP_BC 304(1) and MOVE_to_BC 304(2) micro-ops to initiate the core switch and state migration back to the first core 112. As depicted here, to minimize or hide the latency of core migration, an appropriate distance "D" is provided between the WAKEUP_BC 304(1) and MOVE_to_BC 304(2) micro-ops. The distance may be expressed at time, number of instructions, and so forth. This is discussed in more detail below.

As depicted here, the instrumented program code 302 contains code segments 202 and control micro-ops 304 in the following sequence: the control micro-op 304(3), the code segment 202(1), the control micro-op 304(4), the code segment 202(2). Other control micro-ops 304, code segments 202, and so forth may follow but are not shown for ease of illustration and not by way of limitation. The control micro-ops 304 may be placed immediately prior to code segments 202 associated therewith, or may be inserted at a distance "D" before or after. For example, as shown here, the code segment 202(1) may be slated for execution on the first core 112 while the code segment 202(2) may be slated for execution on the second core 116. The control micro-op 304(3) is placed before the code segment 202(1) at distance "D" from the control micro-op 304(4) to provide time for the second core 116 to reach a desired operating state before migration. For example, the time interval provided by the distance "D" may allow time for the second core 116 to settle prior to beginning execution of the code segment 202(2). In other implementations the distance "D" may be omitted. For example, the WAKEUP_SC control micro-op 304(3) may execute immediately before the MOVE_to_SC control micro-op 304(4).

The code instrumentation unit 126 generates instrumented program code 302 to meet one or more operational parameters. These operational parameters may include minimizing overall power consumption, minimizing heat dissipation, minimizing overall execution time, maximizing core utilization, and so forth. In one implementation, the control micro-operations 304 such as the MOVE_to_SC 304(4) may be inserted when utilization of the first core 112 is below a pre-determined threshold. This low level of utilization may thus indicate the second core 116 offers sufficient resources to provide the same overall level of performance, but at lower power consumption as compared to the first core 112.

In another implementation, the control micro-operations 304 such as MOVE_to_BC 304(2) may be inserted when the code segment 202 calls for a function native to the first instruction set architecture 114 and non-native to the second instruction set architecture 118. For example, when the code instrumentation unit 126 determines a code segment 202 or other code region has a low instruction level parallelism (ILP) and does not utilize the first ISA 114, the control micro-op 304(4) may be inserted to move that code segment 202 to the second core 116 for execution. Similarly, when the code segment 202 which intensively uses the first ISA 114 is determined, the control micro-op 304(2) may be inserted to move that code to the first core 112 for execution.

These code modifications may be performed in special translation cache memory storage coupled to or within the code instrumentation unit 126. By introducing these control micro-ops 304 into the program code 106 to form instrumented program code 304 migration time is significantly reduced. The placement of the wakeup micro-operations such as 304(1) and 304(3) which allows a given core to be pre-warmed and ready for execution before receiving the code segment 202 for execution. As a result, latency is significantly reduced or eliminated. This is illustrated below in more detail with regards to FIG. 4.

While the instrumented program code 302 is shown in a single linear arrangement, in some implementations various control micro-ops 304, code segments 202, and so forth may be executed concurrently. For example, when the WAKEUP_SC 304(3) micro-op is inserted at a beginning of the code segment 202(2), powering up of the second core 116 and the state migration to the second core 116 from the first core 112 may occur in parallel with the code segment 202(2)'s execution on the first core 112 until the first core 112 executes the MOVE_to_SC 304(4) micro-op.

In some implementations insertion of micro-ops such as MOVE_to_BC 304(2) and MOVE_to_SC 304(4) may be implicit or automatically added such that these micro-ops are injected into a pipeline, such as after a pre-defined number of instructions following the wakeup micro-operations such as WAKEUP_BC 304(1) or WAKEUP_SC 304(3). This insertion may be made by the code instrumentation unit 126, remap and migrate unit 108, or other hardware in the ASMP architecture 100.

The code instrumentation unit 126 generates code feedback 128. This code feedback 128 may comprise the instrumented program code 302, the code analysis data 204, as well as other instructions, metrics, and so forth. The instrumented program code 302 may be stored in the instrumented code storage unit 111. The instrumented code storage unit 111 may comprise an address lookup mechanism, such that during program code execution the instrumented code 302 is executed instead of the original program code 106.

Figure 4:
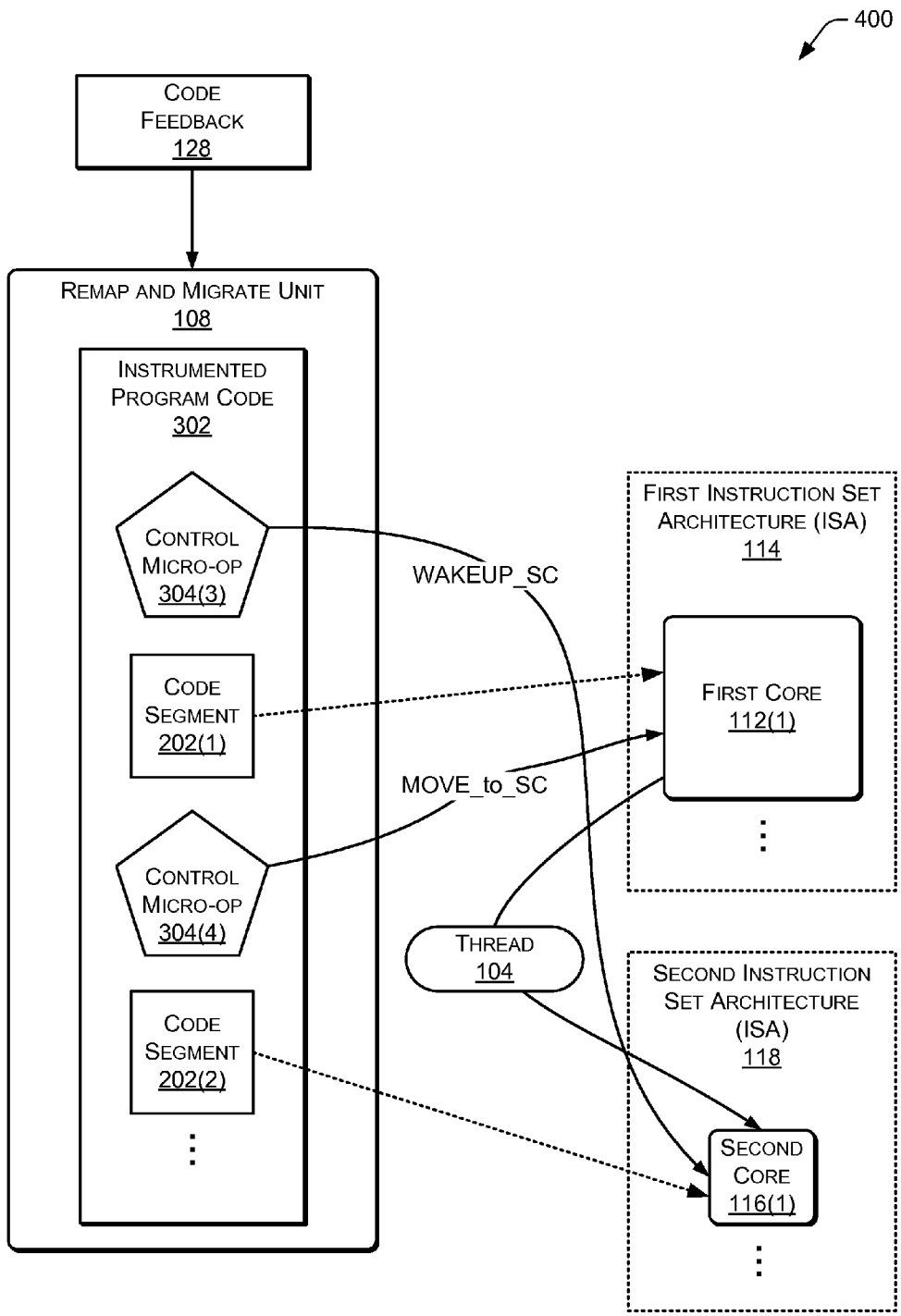
FIG. 4 illustrates a remap and migrate unit migrating program code between cores according to the control micro-operations of the instrumented program code.

FIG. 4 illustrates the remap and migrate unit 108 migrating 400 program code 106 between cores according to the control micro-operations. As mentioned above, the remap and migrate unit 108 may initiate the binary analysis by issuing a request for code analysis 120. In some implementations, this request 120 may be initiated at least in part by looking for changes in performance or P-state. The P-state of a core indicates an operational level of performance, such as may be defined by a particular combination of frequency and operating voltage of the core. For example, a high P-state may involve the core executing at its maximum design frequency and voltage. In some implementations, an operating system executing on the ASMP 100 may transition the P-state from a high value to a low one. When this transition is received, the remap and migrate unit 108 may initiate the binary analysis to distribute code segments 202 across the first core 112 and the second core 116 such that power consumption is minimized. As described above, the binary analysis unit 122 may determine when the program code 106 or portions thereof may be migrated for execution on the second core 116.

The migration and remap unit 108 may also initiate the binary analysis unit 122 to predict future usage of a particular instruction by assessing control registers programmed by the operating system (OS), a virtual machine manager (VMM), and so forth. In particular, the XINIT tracker may be used to determine when the thread 104 of an application has ever used AVX registers. The binary analysis unit 122 may also utilize a performance monitoring unit (PMU) counter to count a number of instructions executed which are supported in the first ISA 114, the second ISA 118, and so forth. For example, as instructions in the first ISA 114 are called, the PMU counter may be incremented. In some implementations, the remap and migrate unit 108 may access or otherwise maintain performance or usage data.

As shown here, the remap and migrate unit (RMU) 108 has received the code feedback 128 comprising the instrumented program 302 as stored in the instrumented code storage unit 111. During execution, the instrumented program code 302 is executed instead of the original program code 106. Using the control-microops 304 therein, the remap and migrate unit 108 may now execute the thread 104 while providing migration of the thread 104 between multiple cores in the ASMP. This migration is transparent to the operating system. The WAKE-UP_SC 304(3) control micro-op is issued to the second core 116(1), pre-warming it for execution of the code segment 202(2) to follow.

The RMU 108 executes the code segment 202(1) on the first core 112(1). Next, the MOVE_to_SC 304(4) control micro-op initiates the migration of the thread 104 from the first core 112 to the second core 116. The first core 112 executes this command, and migrates state information to the second core 116(1), now ready, for execution. The next code segment 202(2) is then sent to the second core 116(1) for execution. In some implementations, the first core 112(1), now unused, may be set to a reduced power state.

Illustrative Processes

The processes described in this disclosure may be implemented by the devices described herein, or by other devices. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. In the context of hardware, the blocks represent arrangements of circuitry configured to provide the recited operations. The order in which the operations are described is not intended to be construed as a limitation, and any number of the described blocks can be combined in any order or in parallel to implement the processes.

Figure 5:
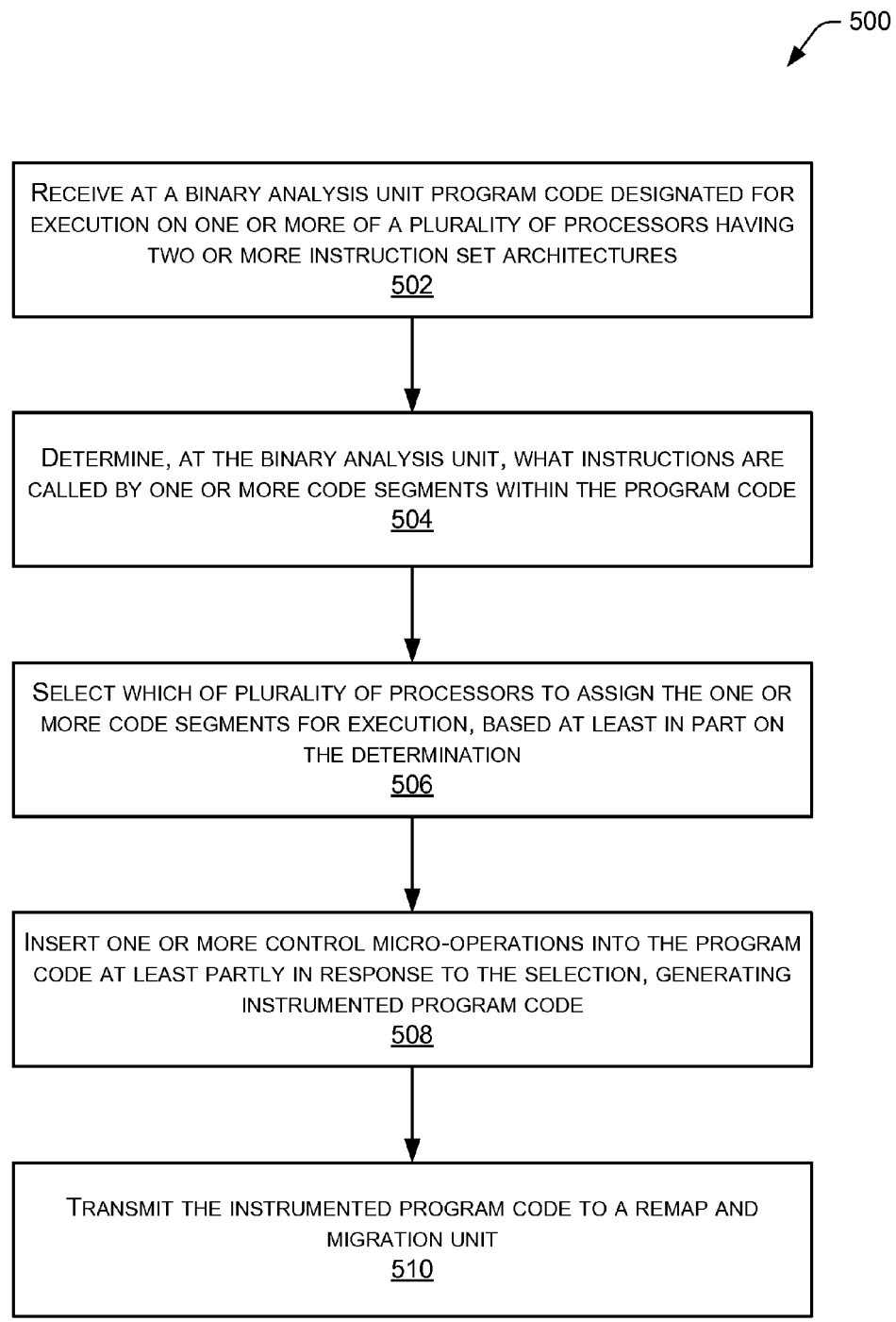
FIG. 5 is an illustrative process of generating instrumented program code.

FIG. 5 is an illustrative process 500 of generating the instrumented program code 302. This process may be performed by the binary analysis unit 122 in some implementations. At 502, the program code 106 is received at the binary analysis unit 122. This program code 106 is designated for execution on one or more of a plurality of processors such as the first core 112 and the second core 116, wherein the plurality of processors have two or more instruction set architectures. For example, the first core 112 implements the first ISA 114 and the second core 116 implements the second ISA 118.

At 504, instructions called by the one or more code segments 202 within the program code 106 are determined. For example, the code analyzer unit 124 may determine that the code segment 202(1) uses instructions native to the first ISA 114.

At 506, one or more of the plurality of processors are selected to assign the one or more code segments 202 to for execution. In some implementations, this selection may be based at least in part on the determination of the instructions called. In other implementations, the selection may be based on other code analysis data 204, pre-determined, and so forth.

At 508, one or more control micro-ops 304 are inserted into the program code 106 at least partly in response to the selection, generating the instrumented program code 302. At 510, the instrumented program code 302 may then be transmitted from the instrumented code storage unit 111 to the RMU 118 for core migration and execution of the thread 104.

Figure 6:
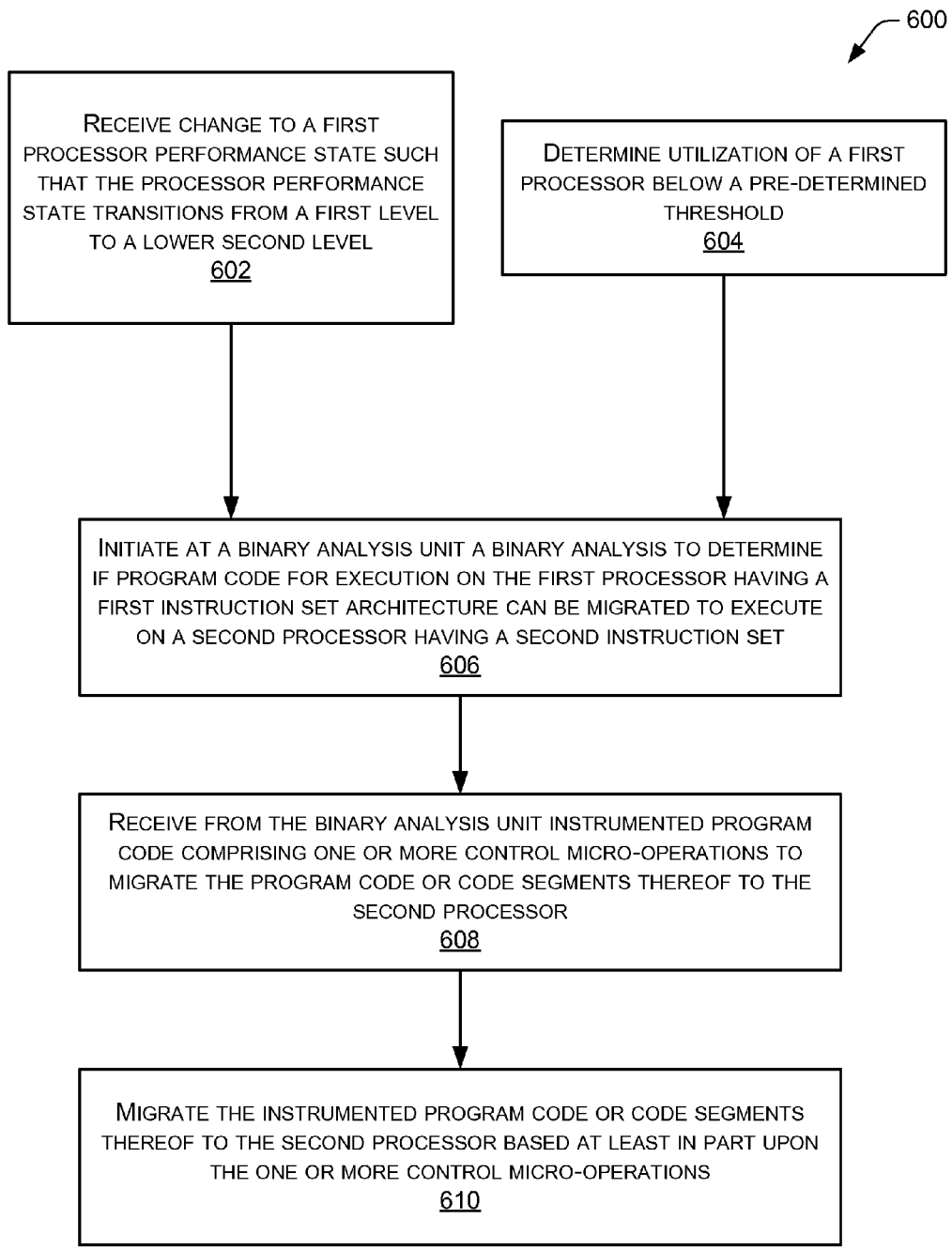
FIG. 6 is an illustrative process of performing a binary analysis for core migration.

FIG. 6 is an illustrative process 600 of performing a binary analysis for core migration. In some implementations, this process may be performed by the RMU 118.

Binary analysis of the program code 106 associated with the thread 102 may be initiated in several ways. For illustration and not by way of limitation, two are illustrated here.

In one implementation, at 602, a change to a first processor performance state (or P-state) such that the processor performance state is to transition from a first level to a lower second level is received. For example, the OS may request a change in the P-state from a high power to a low power state. In another implementation, at 604 utilization of the first processor is determined to be below a pre-determined threshold. For example, the first core 112 may drop below a pre-determined utilization threshold, indicating the first core 112 is underutilized, thus consuming power unnecessarily compared to execution on the second core 116.

At 606, binary analysis of the program code 106 is initiated at the binary analysis unit 122. The binary analysis determines if the program code 106 for execution on the first processor having a first instruction set architecture can be migrated to execute on a second processor having a second instruction set. For example, code segment 202(9) may be executable either natively or with binary translation using either the first ISA 114 of the first core 112 or the second ISA 118 of the second core 116.

At 608, receive the instrumented program code 302 comprising one or more control micro-operations 304 to migrate the program code 106 or the code segments 202 thereof to the second processor. For example, the instrumented program code 302 may comprise the MOVE_to_SC micro-op 304(4) inserted by the binary analysis module 122 for execution prior to the code segment 202(9).

At 610, the instrumented program code 302 migrates the program code 106 or one or more code segments 202 thereof to the second processor based at least in part on the one or more control micro-ops 304. Continuing the example, the RMU 118 may execute the MOVE_to_SC micro-op 304(4) on the first core 112 and migrate the thread 104 to the second core 116 such that the code segment 202(9) executes on the second core 116.

Figure 7:
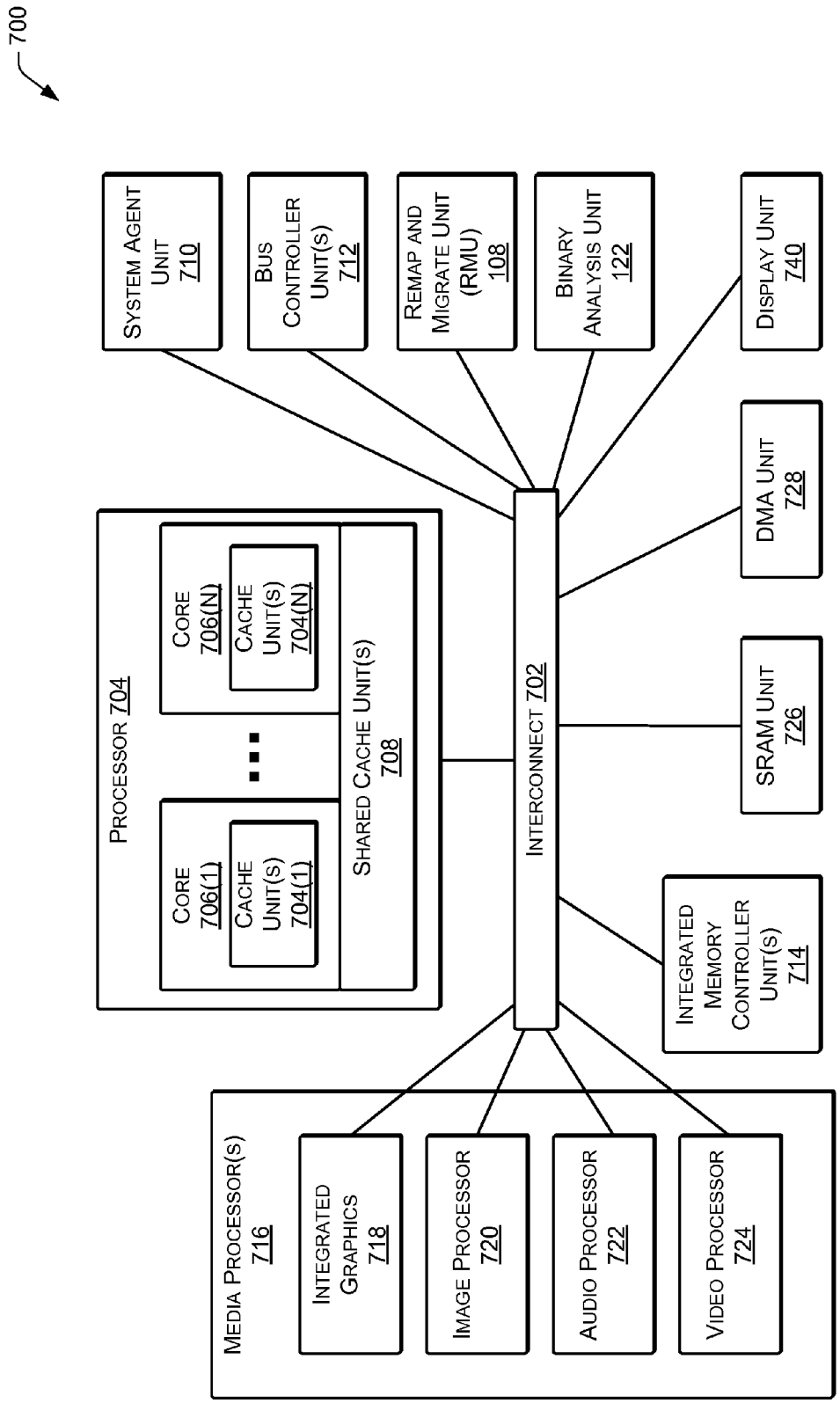
FIG. 7 is a block diagram of an illustrative system to perform migration of program code between asymmetric cores.

FIG. 7 is a block diagram of an illustrative system 700 to perform migration of program code between asymmetric cores. This system may be implemented as a system-on-a-chip (SoC). An interconnect unit(s) 702 is coupled to: one or more processors 704 which includes a set of one or more cores 706(1)-(N) and shared cache unit(s) 708; a system agent unit 710; a bus controller unit(s) 712; an integrated memory controller unit(s) 714; a set or one or more media processors 716 which may include integrated graphics logic 718, an image processor 720 for providing still and/or video camera functionality, an audio processor 722 for providing hardware audio acceleration, and a video processor 724 for providing video encode/decode acceleration; an static random access memory (SRAM) unit 726; a direct memory access (DMA) unit 728; and a display unit 740 for coupling to one or more external displays. In one implementation the RMU 108, the binary analysis unit 122, or both may couple to the cores 706 via the interconnect 702. In another implementation, the RMU 108, the binary analysis unit 122, or both may couple to the cores 706 via another interconnect between the cores.

The processor(s) 704 may comprise one or more cores 706(1), 706(2), ..., 706(N). These cores 706 may comprise the first cores 112(1)-112(C), the second cores 116(1)-116(S), and so forth. In some implementations, the processors 704 may comprise a single type of core such as the first core 112, while in other implementations, the processors 704 may comprise two or more distinct types of cores, such as the first cores 112, the second cores 116, and so forth. Each core may include an instance of logic to perform various tasks for that respective core. The logic may include one or more of dedicated circuits, logic units, microcode, or the like.

The set of shared cache units 708 may include one or more mid-level caches, such as level 2 (L2), level 3 (L3), level 4 (L4), or other levels of cache, a last level cache (LLC), and/or combinations thereof. The system agent unit 710 includes those components coordinating and operating cores 706(1)-(N). The system agent unit 710 may include for example a power control unit (PCU) and a display unit. The PCU may be or include logic and components needed for regulating the power state of the cores 706(1)-(N) and the integrated graphics logic 718. The display unit is for driving one or more externally connected displays.

Figure 8:
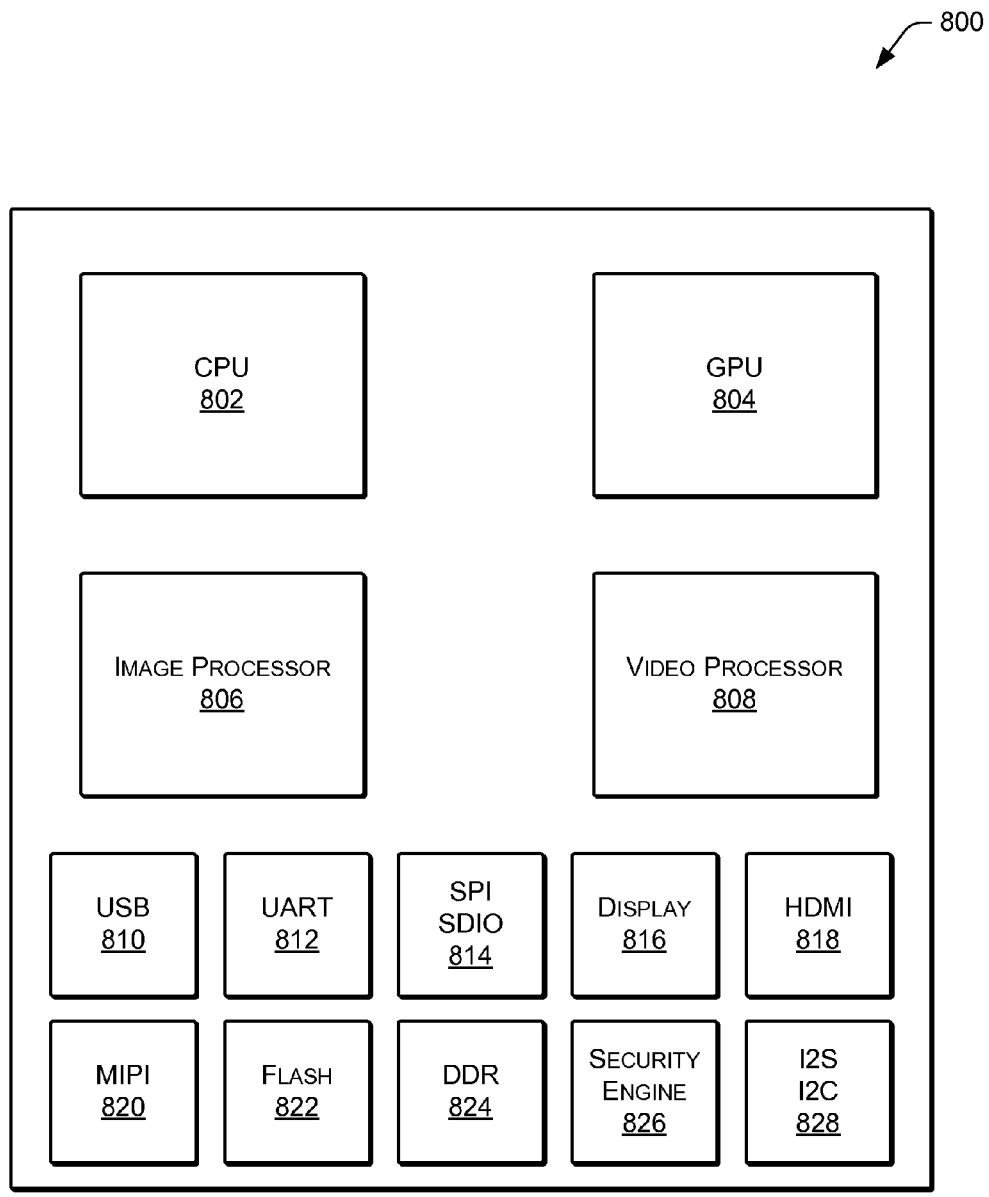
FIG. 8 is a block diagram of a processor according to one embodiment.

FIG. 8 illustrates a processor containing a central processing unit (CPU) and a graphics processing unit (GPU), which may perform instructions for handling core switching as described herein. In one embodiment, an instruction to perform operations according to at least one embodiment could be performed by the CPU. In another embodiment, the instruction could be performed by the GPU. In still another embodiment, the instruction may be performed through a combination of operations performed by the GPU and the CPU. For example, in one embodiment, an instruction in accordance with one embodiment may be received and decoded for execution on the GPU. However, one or more operations within the decoded instruction may be performed by a CPU and the result returned to the GPU for final retirement of the instruction. Conversely, in some embodiments, the CPU may act as the primary processor and the GPU as the co-processor.

In some embodiments, instructions that benefit from highly parallel, throughput processors may be performed by the GPU, while instructions that benefit from the performance of processors that benefit from deeply pipelined architectures may be performed by the CPU. For example, graphics, scientific applications, financial applications and other parallel workloads may benefit from the performance of the GPU and be executed accordingly, whereas more sequential applications, such as operating system kernel or application code may be better suited for the CPU.

FIG. 8 depicts processor 800 which comprises a CPU 802, GPU 804, image processor 806, video processor 808, USB controller 810, UART controller 812, SPI/SDIO controller 814, display device 816, memory interface controller 818, MIPI controller 820, flash memory controller 822, dual data rate (DDR) controller 824, security engine 826, and I2S/I2C controller 828. Other logic and circuits may be included in the processor of FIG. 8, including more CPUs or GPUs and other peripheral interface controllers.

The processor 800 may comprise one or more cores which are similar or distinct cores. For example, the processor 800 may include one or more first cores 112(1)-112(C), second cores 116(1)-116(S), and so forth. In some implementations, the processor 800 may comprise a single type of core such as the first core 112, while in other implementations, the processors may comprise two or more distinct types of cores, such as the first cores 112, the second cores 116, and so forth.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium ("tape") and supplied to various customers or manufacturing facilities to load into the fabrication machines that actually make the logic or processor. For example, IP cores, such as the Cortex™ family of processors developed by ARM Holdings, Ltd. and Loongson IP cores developed the Institute of Computing Technology (ICT) of the Chinese Academy of Sciences may be licensed or sold to various customers or licensees, such as Texas Instruments, Qualcomm, Apple, or Samsung and implemented in processors produced by these customers or licensees.

Figure 9:
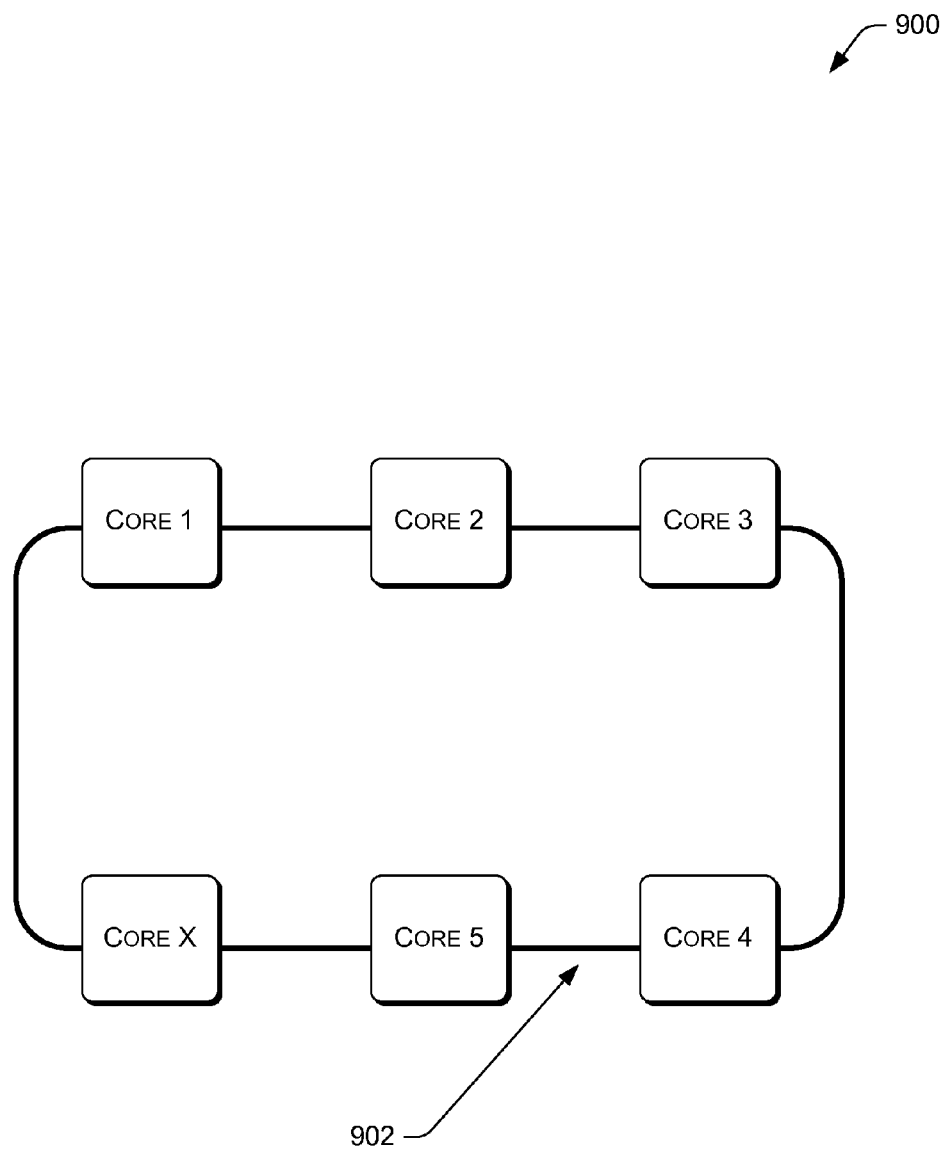
FIG. 9 is a schematic diagram of an illustrative asymmetric multi-core processing unit that uses an interconnect arranged as a ring structure.

FIG. 9 is a schematic diagram of an illustrative asymmetric multi-core processing unit 900 that uses an interconnect arranged as a ring structure 902. The ring structure 802 may accommodate an exchange of data between cores 1, 2, 3, 4, 5, ..., X. As described above, the cores may include one or more of the first cores 112 and one or more of the second cores 116. In some implementations, a plurality of the processors may be coupled in the ring structure as shown here to accommodate an exchange of data between the processors.

Figure 10:
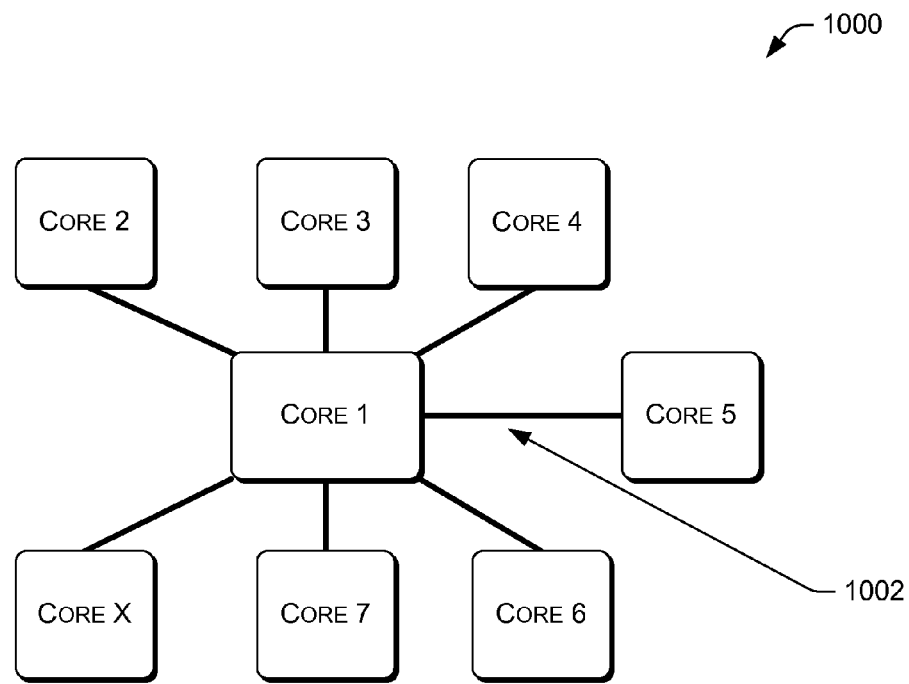
FIG. 10 is a schematic diagram of an illustrative asymmetric multi-core processing unit that uses an interconnect arranged as a mesh.

FIG. 10 is a schematic diagram of an illustrative asymmetric multi-core processing unit 1000 that uses an interconnect arranged as a mesh 1002. The mesh 1002 may accommodate an exchange of data between a core 1 and other cores 2, 3, 4, 5, 6, 7, ..., X which are coupled thereto or between any combinations of the cores. As described above, in some implementations, a plurality of the processors may be coupled in the mesh structure as shown here to accommodate an exchange of data between the processors.

Figure 11:
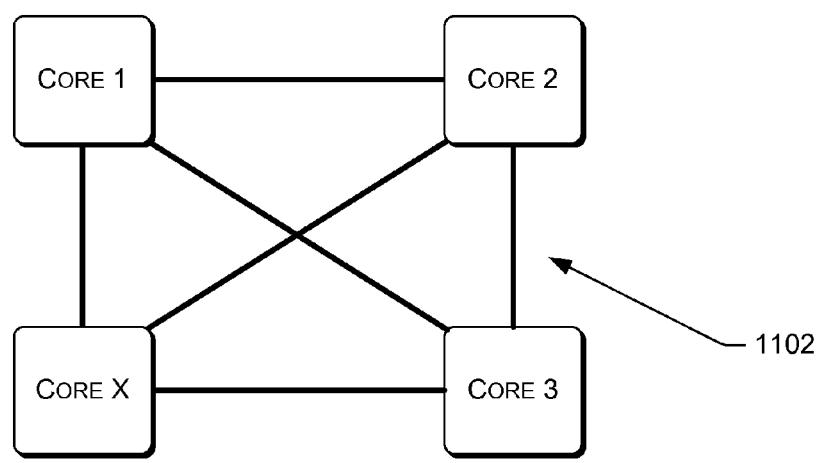
FIG. 11 is a schematic diagram of an illustrative asymmetric multi-core processing unit that uses an interconnect arranged in a peer-to-peer configuration.

FIG. 11 is a schematic diagram of an illustrative asymmetric multi-core processing unit 1100 that uses an interconnect arranged in a peer-to-peer configuration 1102. The peer-to-peer configuration 1102 may accommodate an exchange of data between any combinations of the cores. As described above, in some implementations, a plurality of the processors may be coupled in the peer-to-peer structure as shown here to accommodate an exchange of data between the processors.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. A device comprising:
a code analyzer unit to determine one or more instructions called by a code segment;
a code instrumentation unit to
select a subset of a plurality of processing cores to execute the code segment, the plurality of processing cores comprising a first core to execute a first instruction set architecture and a second core to execute a second instruction set architecture, the selection being based at least in part on the one or more code segments being natively executable in the first instruction set architecture or the second instruction set architecture, and
form instrumented program code by modifying the code segment to include one or more control operations based on the selected subset of the plurality of processing cores, the one or more control operations comprising a core wakeup operation before a move program code operation to initiate migration of the code segment to the first core or the second core.

2. The device of claim 1, wherein the one or more control operations are to pre-warm the particular core and make the particular core ready for execution.

3. The device of claim 1, wherein the plurality of processing cores comprise an asymmetric multiprocessor system.

4. A processor comprising:
a first core to operate at a first maximum power consumption rate and a second core to operate at a second maximum power consumption rate which is less than the first maximum power consumption rate, wherein the first core is to implement a first instruction set architecture and the second core is to implement a second instruction set architecture; and
binary analysis logic to:
determine what instructions are called by one or more code segments within program code;
select which of the first core or the second core to assign the one or more code segments for execution, the selection based at least in part on the one or more code segments being natively executable in the first instruction set architecture or the second instruction set architecture; and
insert, at least partly in response to the selection, one or more control operations into the program code based at least in part on the selection to form instrumented program code, the insertion comprising placing a core wakeup operation before a move program code to initiate migration of the code segment to the first core or the second core.

5. The processor of claim 4, the one or more control operations comprising commands to:
wake up the first core;
wakeup the second core;
move program code to the first core; and
move program code to the second core.

6. The processor of claim 4, further comprising remap and migrate logic to migrate one or more code segments of the instrumented program code to the first core or the second core for execution based at least in part on the one or more control operations.

7. The processor of claim 4, the logic to select which of the first core or the second core to assign the one or more code segments for execution being based at least in part upon receiving a change to a performance state of the first core.

8. The processor of claim 7, wherein the change in the performance state comprises a transition from a first state to a second state lower than the first.

9. The processor of claim 4, wherein the first core and the second core comprise an asymmetric multiprocessor system.

10. The processor of claim 9, wherein the binary analysis logic further to migrate the one or more code segments between cores of the asymmetric multiprocessor system.

11. The processor of claim 4, the logic to select which of the first core or the second core to assign the one or more code segments for execution being based at least in part upon power consumption of the first core or the second core to execute the one or more code segments.

12. A method comprising:
receiving, into a memory, program code for execution on a first processor or a second processor, wherein the first processor to accept a first instruction set architecture and the second processor to accept a second instruction set architecture;
detecting functions called by the program code stored in the memory;
selecting one or more portions of the program code to execute on a particular processor based at least in part upon the functions called, the selecting further select the particular processor such that the detected function called executes natively; and
inserting one or more control operations into the program code stored in the memory to form instrumented program code at least partly in response to the selection, the inserting further to place a processor wakeup operation before a move program code operation in the instrumented program code.

13. The method of claim 12, wherein the one or more control operations wake the first processor or the second processor from a low power state.

14. The method of claim 12, wherein the one or more control operations migrate the program code between the first processor and the second processor.

15. The method of claim 12, wherein the processor wakeup operation before a move program code operation in the instrumented program code to pre-warm the particular processor and make the particular processor ready for execution.

16. The method of claim 12, the inserting comprising adding a processor wakeup operation to the program code.

17. The method of claim 16, the inserting further comprising adding a program code move operation after a pre-determined number of executed instructions.

18. The method of claim 12,
the selecting further comprising selecting the particular processor such that the program code executes with instruction-level parallelism.

19. The method of claim 12, the selecting being based at least in part on power consumption of the functions called if executed by the first processor or the second processor.

* * * * *